Patented Mar. 14, 1950

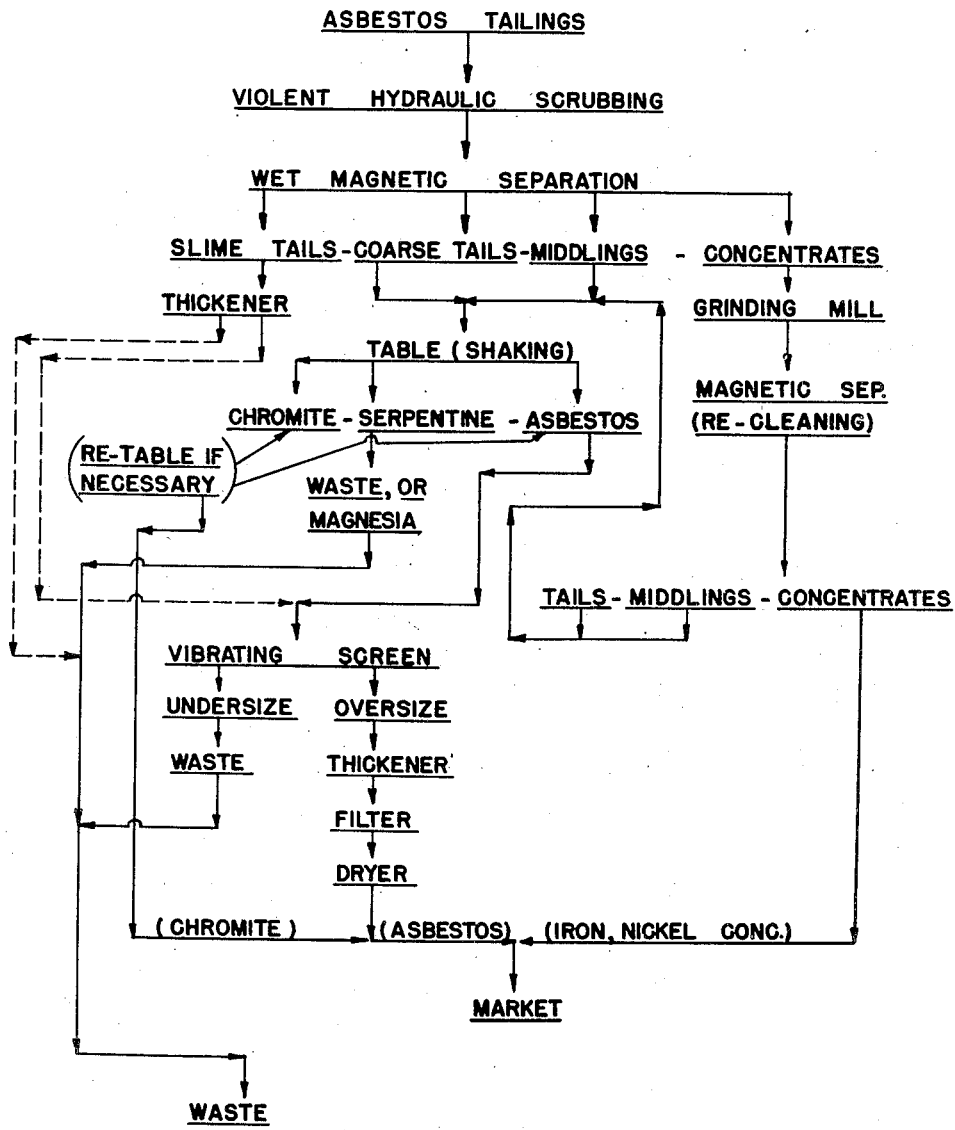

2,500,154

UNITED STATES PATENT OFFICE 2,500,154

RECOVERY OF ASBESTOS FROM ASBESTOS TAILINGS

Robert E. Crockett, Montclair, N. J., assignor to H. A. Brassert & Company, New York, N. Y., a corporation of Illinois Application September 28, 1946, Serial No. 700,021

1 Claim. (Cl. 209—2)

This invention relates to methods for producing asbestos fibers, and it relates particularly to methods for recovering asbestos fibers from the tailings produced in asbestos mining operations.

Chrysotile, the most common source of asbestos fibers, occurs in veins in serpentine rock which usually is found in formations containing iron, nickel, and chrome ores. During the mining of chrysotile, the rock is removed and crushed in order to separate the chrysotile crystals from the rock. When chrysotile is separated from the rock, substantial quantities of the asbestos fibers remain attached to the rock and are discarded with the rock as a tailing. Despite the fact that substantial quantities of asbestos are present in the tailings, it has not been feasible or economical heretofore to attempt to separate and recover the asbestos.

One of the principal difficulties encountered in recovering the asbestos fibers from the tailings has been to separate them without deterioration in the quality of the fibers. Such operations as dry or wet grinding of the tailings breaks the fibers into short lengths which reduce their market value to such an extent that recovery is uneconomical.

An object of the present invention is to provide a method for recovering asbestos fibers from a tailings resulting from such mining operations in an economical and simple manner.

A further object of the invention is to provide a method for treating asbestos-containing tailings to recover the asbestos fibers therefrom and sufficient other components of the tailings to render the method economically feasible.

Another object of the present invention is to provide a method for treating asbestos-containing tailings to recover the asbestos fibers therein without substantial deterioration in the quality of the fibers.

Other objects of the invention will become apparent from the following description of a typical method embodying the present invention.

I have discovered that the asbestos fibers in the tailings from asbestos mining operations can be detached from the other components of the tailings by subjecting a slurry or a mixture of coarsely ground tailings and water to violent agitation and scrubbing, involving some disintegration, by means of a propeller blade or a like agitator without appreciably damaging the fibers. This operation also cleans the asbestos fibers of dirt, fine rock, ore, or particles and places them in condition whereby they can be segregated by simple tabling, concentrating, and classifying operations.

The present invention overcomes the difficulties of prior attempts to recover the asbestos fibers from the tailings by preliminary grinding for the reason that the hydraulic scrubbing and agitation of this invention does not subject the fibers to sufficiently violent impact to break them into shorter lengths. Instead it separates the fibers substantially cleanly from the rock, even in cases where the fibers are disposed in recesses in the rock or are adhered to or "grow" out of the ore. Therefore, the method of the present invention permits substantially complete recovery of fibers as a commercially valuable "fluff from tailings that have been regarded heretofore as a valueless waste product. Moreover, it is possible to produce other by-products such as iron, nickel, and chrome ores in a concentrated form that is useful in the steel and iron industry.

For a better understanding of the present invention, reference may be had to the accompanying drawings in which the single figure discloses a typical flow sheet of the method embodying the invention.

As illustrated in the drawing, the coarsely ground asbestos tailings which comprise a mixture of serpentine rock, chrome, iron, and nickel ores, dirt and other materials and asbestos fibers attached to the serpentine rock, is mixed with water and is subjected to a violent hydraulic scrubbing by disposing the mixture in a tank which is provided with a propeller blade or paddle arrangement that is rotated at relatively high speed.

The scrubbing operation which may be conducted for a period of ½ to 2 hours detaches the asbestos fibers or crystals from the rock and separates tiny particles of grit, dust, dirt, and other impurities from the fibers.

Following the scrubbing operation, the scrubbed material is fed to a wet magnetic separator of conventional type, such as the Dings-Crockett separator, which produces a rougher concentrate containing iron, nickel, and some chrome ore. This concentrate may be ground and retreated in another wet magnetic separator to improve the grade of the iron and nickel ore and to remove some chrome ore and other gangue material. This recleaned concentrate is of value as a source of iron and nickel for use in the iron and steel industry.

The wet magnetic separator will also produce a middling material, a spigot product, a coarse tailing spigot product, and a fine or slime overflow tailing.

The coarse tailing and middling products are delivered to a wet shaking table of a conventional type where a chrome ore concentrate, a serpentine rock middling product, and an asbestos fiber tailing are produced.

The chrome concentrate may be cleaned further by retabling and provides a useful source of chromium.

The serpentine rock middling is of little value other than for its magnesia content and can be discarded.

The asbestos tailing can be passed to a further shaking table where grit particles are eliminated and a cleaned fiber is produced.

The slime tailing product from the magnetic separator can, if desired, be sent to thickeners of the Dorr type where excess water is removed. However, the fibers and other material contained in the slime tailing product are not very valuable and can be delivered to waste instead of thickening, if desired.

In order to classify the asbestos fiber product produced by the tabling operations, it is passed to a vibrating screen of a very fine mesh, for example, 65 or 100 mesh, or even finer, where the fibers are further scrubbed and any fine fibers or very short fibers will be removed. The fibers remaining on top of the screen will be discharged as an oversize product of considerable commercial value.

If the slime has been thickened in a Dorr thickener, it also can be passed over the shaking screen in order to remove valuable asbestos fiber therefrom. The oversize asbestos product from the shaking screen is then delivered to a thickener of the Dorr type for dewatering, and the concentrated product can be removed, filtered, and dried to provide a commercially valuable "fluff."

The method described above results in very satisfactory recovery of asbestos fibers of a commercially valuable length from the tailings and inasmuch as the method permits large quantities of the tailing to be handled with a small amount of equipment and expenditure of power, the fibers can be recovered sufficiently economically to justify the treatment of the tailings. The cost of production of the fiber is reduced further by the recovery of chrome, nickel, and iron ores which are of commercial value.

It will be understood that the procedure followed subsequent to the hydraulic scrubbing operation is susceptible to considerable variation as indicated above depending upon the type of tailings being treated.

Therefore, the process described above should be considered as illustrative and not as limiting the scope of the following claim.

I claim:

A method of recovering asbestos from tailings of asbestos mining operations, said tailings containing serpentine rock, iron, nickel and chrome ores and asbestos fibers attached to said rock, comprising mixing of said tailings with water, subjecting the tailings to violent hydraulic scrubbing to free the fibers from other components of said tailings, magnetically concentrating and separating said iron and nickel ores from said mixture, wet tabling said mixture to separate it into a chrome concentrate, a serpentine rock middling and a substantially clean asbestos fiber tailing, and then classifying said tailing to separate the fine fibers from the longer fibers.

ROBERT E. CROCKETT.

REFERENCES CITED

The following references are of record in the file of this patent:

UNITED STATES PATENTS

| Number | Name | Date |
| --- | --- | --- |
| 1,338,613 | Cilley | Apr. 27, 1920 |
| 1,632,620 | Nanfeldt | June 14, 1927 |
| 1,684,365 | Dolbear | Sept. 11, 1928 |
| 1,684,366 | Dolbear | Sept. 11, 1928 |
| 1,714,438 | Rosé | May 21, 1929 |
| 1,741,869 | Mett | Dec. 31, 1929 |
| 2,291,042 | Kennedy | July 28, 1942 |
| 2,386,713 | Pharo | Oct. 9, 1945 |

OTHER REFERENCES

Bureau of Mines R. I., 4079, June 1947 (26 pages).